(12) United States Patent
Drutsa

(10) Patent No.: US 10,277,694 B2
(45) Date of Patent: Apr. 30, 2019

(54) METHOD FOR DETERMINING A TREND OF A USER ENGAGEMENT METRIC

(71) Applicant: YANDEX EUROPE AG, Lucerne (CH)

(72) Inventor: Aleksey Valerevich Drutsa, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 303 days.

(21) Appl. No.: 15/224,833

(22) Filed: Aug. 1, 2016

(65) Prior Publication Data

US 2017/0289284 A1    Oct. 5, 2017

(30) Foreign Application Priority Data

Apr. 4, 2016  (RU) ................................ 2016112615

(51) Int. Cl.
    *H04L 29/08*    (2006.01)
(52) U.S. Cl.
    CPC ............. *H04L 67/22* (2013.01); *H04L 67/02* (2013.01); *H04L 67/306* (2013.01)
(58) Field of Classification Search
    CPC ...................................................... H04L 67/22
    USPC ........................................................ 709/224
    See application file for complete search history.

(56) References Cited

U.S. PATENT DOCUMENTS

| | | | |
|---|---|---|---|
| 7,774,335 B1 | 8/2010 | Scofield et al. | |
| 7,975,000 B2* | 7/2011 | Dixon ................... | G06Q 30/02 705/14.41 |
| 8,775,603 B2* | 7/2014 | Hansen .................. | G06Q 30/02 705/4 |
| 8,869,019 B1* | 10/2014 | Sampath-Kumar ......................... | G06F 17/2235 715/208 |
| 9,246,957 B2* | 1/2016 | Moeinifar ............. | H04L 65/403 |
| 9,996,513 B2* | 6/2018 | Anderson ............. | G06F 16/957 |

(Continued)

FOREIGN PATENT DOCUMENTS

| | | |
|---|---|---|
| CN | 104281691 A | 1/2015 |
| EP | 2327022 B1 | 9/2015 |

(Continued)

OTHER PUBLICATIONS

Merritt et al., "Social Network Dynamics in a Massive Online Game: Network Turnover, Non-densification, and Team Engagement in Halo Reach", 2013 (Year: 2013).*

(Continued)

*Primary Examiner* — Ondrej C Vostal
(74) *Attorney, Agent, or Firm* — BCF LLP

(57) ABSTRACT

A computer-implemented method and a server with a processor are presented for determining a trend of a user engagement metric with respect to a web service. The method comprises receiving a plurality of user device requests, providing a test version of the web service to a test group and a control version of the web service to a control group, acquiring an amplitude metric and a phase metric for each one of the user devices of at least the test group, determining average group metrics, and determining the trend of the user engagement metric with respect to the web service, the determining the trend being based on analyzing of the control average amplitude metric and the test average amplitude and phase metrics.

18 Claims, 5 Drawing Sheets

(56) References Cited

U.S. PATENT DOCUMENTS

| | | | |
|---|---|---|---|
| 2004/0117759 A1* | 6/2004 | Rippert, Jr. | G06F 8/20 717/100 |
| 2006/0224587 A1* | 10/2006 | Zamir | G06F 17/30867 |
| 2008/0189408 A1* | 8/2008 | Cancel | G06Q 10/04 709/224 |
| 2010/0082566 A1* | 4/2010 | Wang | G06F 17/30648 707/705 |
| 2011/0238496 A1* | 9/2011 | Gurbuxani | G06Q 30/02 705/14.49 |
| 2013/0073306 A1* | 3/2013 | Shlain | G06Q 50/22 705/2 |
| 2013/0159498 A1* | 6/2013 | Funge | H04L 65/80 709/224 |
| 2013/0198376 A1* | 8/2013 | Landa | G06Q 10/04 709/224 |
| 2013/0262371 A1 | 10/2013 | Nolan | |
| 2014/0280862 A1* | 9/2014 | Aurisset | H04L 41/5067 709/224 |
| 2015/0007065 A1* | 1/2015 | Krishnamoorthy | H04L 67/22 715/760 |
| 2015/0012852 A1* | 1/2015 | Borodin | G06F 11/3664 715/762 |
| 2015/0019639 A1* | 1/2015 | Marlow | H04W 4/21 709/204 |
| 2015/0032866 A1* | 1/2015 | Johnson | G06Q 30/0201 709/221 |
| 2015/0066594 A1* | 3/2015 | Li | G06Q 30/0202 705/7.31 |
| 2015/0067527 A1* | 3/2015 | Gardner | G06F 3/0482 715/739 |
| 2015/0095471 A1* | 4/2015 | Singh | G06Q 10/10 709/221 |
| 2015/0154291 A1* | 6/2015 | Shepherd | G06F 17/30861 707/748 |
| 2015/0169587 A1* | 6/2015 | Silverman | G06F 17/3053 707/751 |
| 2015/0178282 A1* | 6/2015 | Gorur | G06F 17/30867 707/748 |
| 2015/0220970 A1* | 8/2015 | Greenzeiger | G06Q 30/0244 705/14.43 |
| 2016/0034468 A1* | 2/2016 | Hart | G06F 17/3053 707/751 |
| 2016/0080485 A1* | 3/2016 | Hamedi | H04L 67/02 709/204 |
| 2016/0103758 A1* | 4/2016 | Zhao | G06F 8/65 717/124 |
| 2016/0104067 A1* | 4/2016 | Xu | G06F 16/951 706/46 |
| 2016/0173560 A1* | 6/2016 | Datta | H04L 67/02 709/203 |
| 2016/0253696 A1* | 9/2016 | Gui | G06Q 30/0243 705/14.42 |
| 2016/0352847 A1* | 12/2016 | Frasca | H04L 43/16 |
| 2017/0154356 A1* | 6/2017 | Trevisiol | G06Q 30/0246 |
| 2017/0195854 A1* | 7/2017 | Shi-Nash | H04W 4/029 |
| 2017/0250882 A1* | 8/2017 | Kellicker | H04L 43/08 |

FOREIGN PATENT DOCUMENTS

| | | | | |
|---|---|---|---|---|
| RU | 2449383 C2 | 4/2012 | | |
| WO | WO-2008137522 A2 * | 11/2008 | | G06Q 30/02 |
| WO | WO-2010011792 A2 * | 1/2010 | | H04L 41/0853 |
| WO | WO-2017223230 A1 * | 12/2017 | | |

OTHER PUBLICATIONS

Song et al., "Evaluating and Predicting User Engagement Change and Degraded Search Relevance", 2013 (Year: 2013).*

Lucca et al., "Testing Web-based applications: The state of the art and future trends", 2006 (Year: 2006).*

Kiseleva et al., "Predicting User Satisfaction with Intelligent Assistants", 2016 (Year: 2016).*

Drutsa et al., "Engagement Periodicity in Search Engine Usage: Analysis and its Application to Search Quality Evaluation", Feb. 2015 (Year: 2015).*

Harries et al., "Transforming Feedback", "A study of how interactive, engagement-oriented feedback can enhance behavior change around electricity consumption", 2014 (Year: 2014).*

Dupret et al., "Absence Time and User Engagement: Evaluating Ranking Functions", 2013 (Year: 2013).*

Kohavi et al., "Seven Rules of Thumb for Web Site Experimenters", 2014 (Year: 2014).*

Lehmann et al., "Models of User Engagement", 2012 (Year: 2012).*

Song et al., "Evaluating and Predicting User Engagement Change with Degraded Search Relevance", 2013 (Year: 2013).*

Drutsa et al., Engagement Periodicity in Search Engine Usage: Analysis and its Application to Search Quality Evaluation, Conference Paper—Feb. 2015.

English abstract of CN104281691 retrieved from Espacenet on May 31, 2016.

Search Report from the counterpart application RU2016112615 dated Mar. 10, 2017.

* cited by examiner

| User Device A Day | Number of sessions | User Device F Day | Number of sessions |
|---|---|---|---|
| 1 | 1 | 1 | 2 |
| 2 | 2 | 2 | 3 |
| 3 | 1 | 3 | 1 |
| 4 | 3 | 4 | 1 |
| 5 | 4 | 5 | 2 |
| 6 | 1 | 6 | 4 |
| 7 | 2 | 7 | 1 |
| 8 | 5 | 8 | 4 |
| 9 | 4 | 9 | 5 |
| 10 | 1 | 10 | 2 |

310　　　360

FIG. 4

METHOD FOR DETERMINING A TREND OF A USER ENGAGEMENT METRIC

CROSS-REFERENCE

The present application claims priority to Russian Patent Application No. 2016112615, filed Apr. 4, 2016, entitled "METHOD FOR DETERMINING A TREND OF A USER ENGAGEMENT METRIC" the entirety of which is incorporated herein.

TECHNICAL FIELD

The present technology relates to methods and systems for determining a trend in user engagement metrics with respect to a web service.

BACKGROUND

In recent years, A/B testing has become the state-of-the-art technique for improving web services based on data-driven decisions. An A/B test compares two variants of a service at a time, usually its current version (a control version) and a new one (a test version having an experimental treatment applied thereto), by exposing them to two groups of users. They are utilized by many web services providers, including for example search engine companies and social networks. The largest web services have designed special experimental platforms that allow them to run A/B tests at large scale.

One aim of the controlled A/B experiments is to detect the causal effect on user engagement of experimental treatments applied to the web service. A challenging problem is to choose an appropriate criterion applicable in practice, since it has to meet two crucial requirements, which often conflict.

First, the criterion should provide a quantitative value that allows making conclusions about the change in the system's quality, particularly, about the sign and magnitude of that change. In other words, the value of the criterion must have a clear interpretation. It is known in the art that many criteria may result in contradictory interpretations and their use in practice may be misleading and, therefore, the right choice of an appropriate criterion is a difficult task.

Second, when a treatment effect exists (e.g., effect of modifications on the user behavior), the criterion has to detect the difference of the two versions of the system at a high level of statistical significance in order to distinguish the treatment effect from the noise observed when the effect does not exist. This property is referred to as the sensitivity of the metric. The common problem is the low metric sensitivity in the cases when only a subtle modification is being tested or if only a small amount of user traffic is affected by the system change.

The state-of-the-art criteria for evaluating the performance of the two versions are generally based on mean values of the user behavior metrics. However, a disadvantage of these criteria is that the mean values of the user behavior metrics, when averaged over an experimental period, may not reflect a general trend over an experimental period of the user engagement.

SUMMARY

It is an object of the present to ameliorate at least some of the inconveniences present in the prior art.

According to one aspect of the present technology, there is provided a computer-implemented method for determining a trend of a user engagement metric with respect to a web service, the method being executable by a server. The method comprises receiving, at the server, a plurality of user device requests relating to a web service during an experimental period, the plurality of user device requests originating from a plurality of user devices; providing, by the server, a test version of the web service to a test group selected from the plurality of user devices, the test version of the web service being the web service having an experimental treatment applied thereto; providing, by the server, a control version of the web service to a control group selected from the plurality of user devices, the control version of the web service being a version of the web service without the experimental treatment applied thereto; acquiring an amplitude metric and a phase metric for each one of the user devices of the control and test groups. The acquiring includes, for a given one of the user devices of the control and test groups, acquiring, by the server, a plurality of indications for the given one, the plurality of indications being based on interactions of the given one with its corresponding web service, accessing the plurality of indications for the given one, calculating a periodicity metric based at least in part on a discretization transform performed on the plurality of indications, calculating the amplitude metric based at least in part on a magnitude of the periodicity metric, the amplitude metric representing a magnitude of change of the user engagement metric with respect to the corresponding web service, and calculating the phase metric based at least in part on an imaginary part of the periodicity metric, the phase metric representing a direction of change of the user engagement metric with respect to the corresponding web service. The method further comprises determining, by the server, average group metrics including calculating a control average amplitude metric by averaging amplitude metrics calculated for each of the user devices of the control group, calculating a test average amplitude metric by averaging amplitude metrics calculated for each of the user devices of the test group, and calculating a test average phase metric by averaging phase metrics calculated for each of the user devices of the test group; and determining the trend of the user engagement metric with respect to the web service, the determining the trend being based on analyzing of the control average amplitude metric and the test average amplitude and phase metrics.

In some implementations, the analyzing of the control average amplitude metric and the test average amplitude and phase metrics includes determining a difference between the test average amplitude metric and the control average amplitude metric.

In some implementations, the method further comprises determining that the experimental treatment applied to the web service has caused an increasing trend in the user engagement metric over the web service without the experimental treatment when a difference between the test average amplitude metric and the control average amplitude metric is positive and the test average phase metric is positive.

In some implementations, an increasing value of the user engagement metric indicates a positive effect of the experimental treatment on user engagement and the increasing trend in the user engagement metric indicates an increase in user engagement over the experimental period.

In some implementations, the method further comprises determining that the experimental treatment applied to the web service has caused an increasing trend in the user engagement metric over the web service without the experimental treatment when a difference between test average amplitude metric and the control average amplitude metric is negative and the test average phase metric is negative.

In some implementations, a decreasing value of the user engagement metric indicates a positive effect of the experimental treatment on user engagement and the increasing trend in the user engagement metric indicates a decrease in user engagement.

In some implementations, the method further comprises determining that the experimental treatment applied to the web service has caused a decreasing trend in the user engagement metric over the web service without the experimental treatment when a difference between the test average amplitude metric and the control average amplitude metric is positive and the test average phase metric is negative.

In some implementations, an increasing value of the user engagement metric indicates a positive effect of the experimental treatment on user engagement and the decreasing trend in the user engagement metric indicates a decrease in user engagement.

In some implementations, the method further comprises determining that the experimental treatment applied to the web service has caused a decreasing trend in the user engagement metric over the unmodified version of the web service when a difference between the test average amplitude metric and the control average amplitude metric is negative and the test average phase metric is.

In some implementations, a decreasing value of the user engagement metric indicates a positive effect of the experimental treatment on user engagement and the decreasing trend in the user engagement metric indicates an increase in user engagement.

In some implementations, the interactions of the given user device include at least a number of sessions.

In some implementations, the interactions of the given user device include at least a dwell time.

In some implementations, the interactions of the given user device include at least a time per session.

In some implementations, the interactions of the given user device include at least a number of clicks.

In some implementations, the discretization transform is performed using a discrete Fourier transform.

In some implementations, the discretization transform is performed using at least one of a wavelet transform and a Laplace transform.

In some implementations, the interactions of the given user device include at least a number of queries.

In some implementations, the web service is a search engine.

In some implementations, the web service is a search engine results page.

According to another aspect of the present technology, there is provided a server comprising a processor, the processor being configured to determine a trend of a user engagement metric with respect to an experimental web service. The processor is configured to render the server to execute receiving, at the server, a plurality of user device requests relating to a web service during an experimental period, the plurality of user device requests originating from a plurality of user devices, providing, by the server, a test version of the web service to a test group selected from the plurality of user devices, the test version of the web service being the web service having an experimental treatment applied thereto, providing, by the server, a control version of the web service to a control group selected from the plurality of user devices, the control version of the web service being a version of the web service without the experimental treatment applied thereto, acquiring an amplitude metric and a phase metric for each one of the user devices of the control and test groups. The acquiring includes, for a given one of the user devices of the control and test groups, acquiring, by the server, a plurality of indications for the given one, the plurality of indications being based on interactions of the given one with its corresponding web service, accessing the plurality of indications for the given one, calculating a periodicity metric based at least in part on a discretization transform performed on the plurality of indications, calculating the amplitude metric based at least in part on a magnitude of the periodicity metric, the amplitude metric representing a magnitude of change of the user engagement metric with respect to the corresponding web service, and calculating the phase metric based at least in part on an imaginary part of the periodicity metric, the phase metric representing a direction of change of the user engagement metric with respect to the corresponding web service. The processor is further configured to render the server to execute determining, by the server, average group metrics including calculating a control average amplitude metric by averaging amplitude metrics calculated for each of the user devices of the control group, calculating a test average amplitude metric by averaging amplitude metrics calculated for each of the user devices of the test group, calculating a control average phase metric by averaging phase metrics calculated for each of the user devices of the control group, and calculating a test average phase metric by averaging phase metrics calculated for each of the user devices of the test group and determining the trend of the user engagement metric with respect to the web service, the determining the trend being based on analyzing of the control average amplitude and phase metrics and the test average amplitude and phase metrics.

In some implementations of the server, the web service is a search engine.

In some implementations of the server, the web service is a search engine results page.

In the context of the present specification, unless expressly provided otherwise, an "electronic device", a "user device", a "server", and a "computer-based system" are any hardware and/or software appropriate to the relevant task at hand. Thus, some non-limiting examples of hardware and/or software include computers (servers, desktops, laptops, netbooks, etc.), smartphones, tablets, network equipment (routers, switches, gateways, etc.) and/or combination thereof.

In the context of the present specification, unless expressly provided otherwise, the expression "computer-readable medium" and "storage" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

BRIEF DESCRIPTION OF THE DRAWINGS

For a better understanding of the present technology, as well as other aspects and further features thereof, reference is made to the following description which is to be used in conjunction with the accompanying drawings, where:

FIG. 4 is an example data table displaying a plurality of user indications for two user devices over a ten day experimental period, the data table maintained by the server of the system of FIG. 1.

DETAILED DESCRIPTION

The present detailed description is intended to be only a description of illustrative examples of the present technology. This description is not intended to define the scope nor set forth the bounds of the present technology. In some cases, helpful examples of modifications may be set forth as an aid to understanding the present technology, and not to define the scope or set forth the bounds of the present technology. These modifications are not an exhaustive list and other modifications are likely possible. Further, where this has not been done (i.e. where no examples of modifications have been set forth), it should not be interpreted that no modifications are possible and/or that what is described is the sole manner of implementing that particular aspect of the present technology. In addition it is to be understood that the present detailed description provides in certain instances simple implementations of the present technology, and that where such is the case they have been presented in this manner as an aid to understanding. Various implementations of the present technology may be of a greater complexity.

Figure 1:
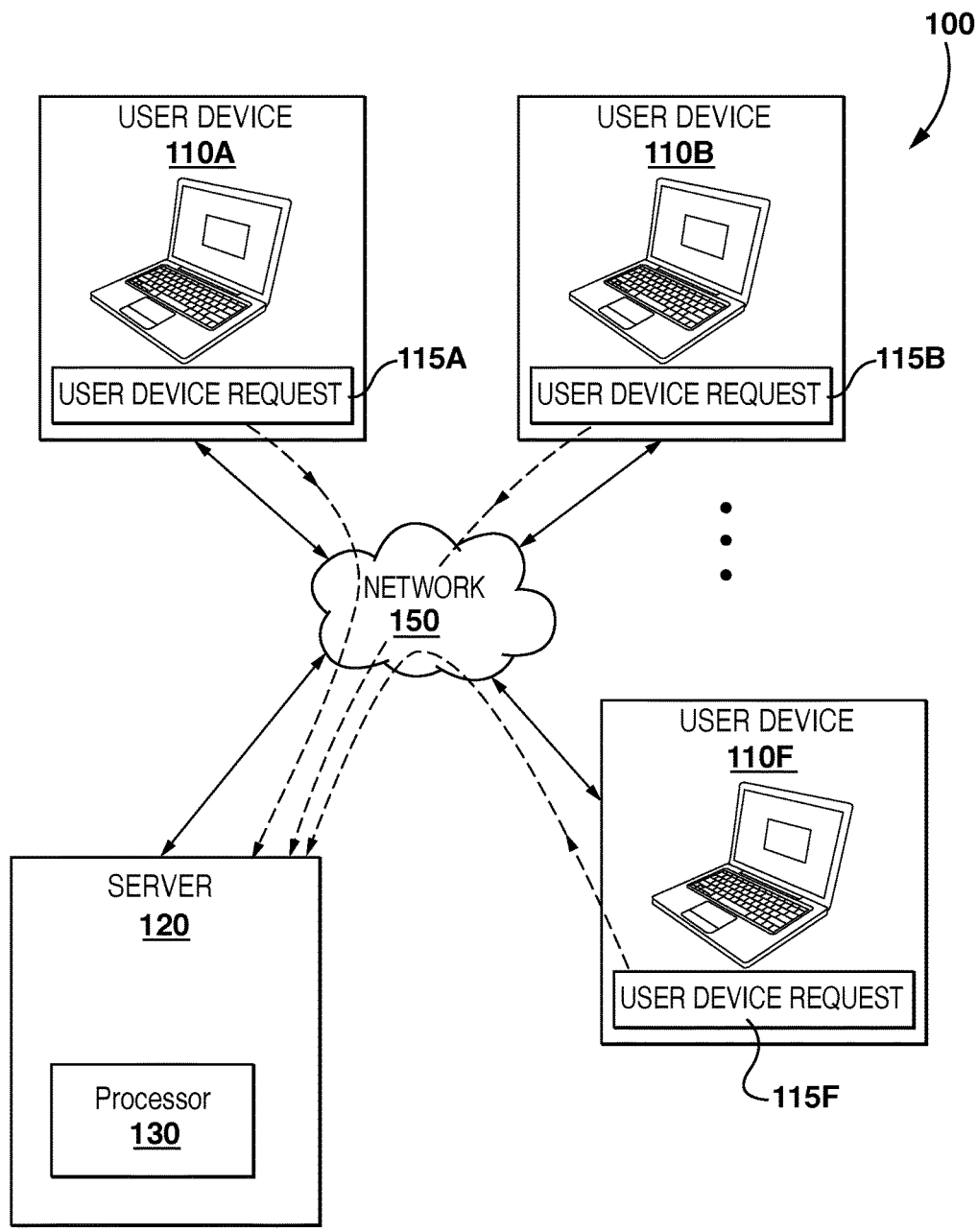
FIG. 1 is a schematic diagram of a non-limiting implementation of a computer-implemented system in accordance with the present technology.
Figure 2:
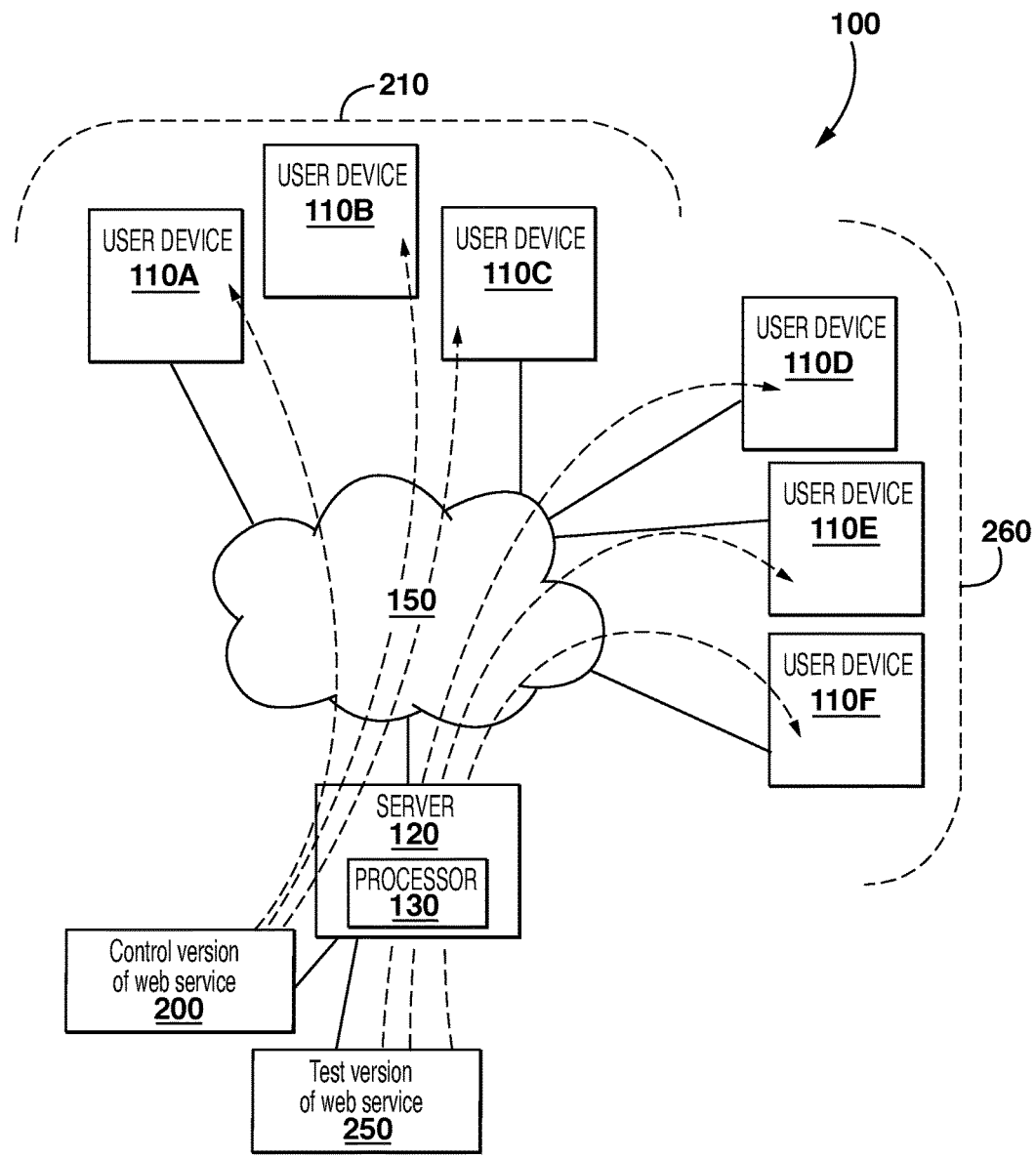
FIG. 2 is another schematic diagram of the non-limiting implementation of a computer-implemented system of FIG. 1.

Referring to FIGS. 1 and 2, a simplified schematic representation of a computer-implemented system 100 (or simply system 100) in accordance with various non-limiting embodiments of the present technology is presented. The system 100 includes a network 150 to enable different system components to communicate. In some non-limiting implementations, the network 150 can be implemented as an Internet communications network 150. In other implementations of the present technology, the network 150 can be implemented differently, including such as a wide-area communication network 150, a local-area communication network 150 and the like.

User devices 110A-F are also included in the system 100, each user device 110A-F being a device utilized by a user of the system 100, only user devices 110A, 110B, and 110F being explicitly illustrated in FIG. 1. The user devices 110A-F connect to the network 150, whereby the user devices 110A-F can send information to and receive information from other components of the system 100. While only six user devices 110A-F are illustrated (all are shown in FIG. 2, a subset in FIG. 1), it is contemplated that any number of user devices 110A-F could be connected to the system 100. It is further contemplated that in some implementations, the number of user devices 110A-F included in the system 100 could number in the tens or hundreds of thousands.

The user devices 110A-F are laptops 110A-F as illustrated in FIG. 1. Various types of user devices 110A-F may be used, however, in the context of the present technology. It is contemplated, for example, that the user device 110A-F could be a smart phone, a tablet, a computer, a television, a game console, or any other type of user device 110A-F which is adapted for, and capable of, accessing the network 150. The user device 110A-F may access the network 150 directly, or through an extranet server, a Wi-Fi access point, an Internet service provide, a cellular service provider, etc.

A server 120 having a processor 130 is also included in the system 100. The server 120 is connected via the network 150, whereby the server 120 can send information to and receive information from other components of the system 100. Only one server 120 is illustrated in FIG. 1, but it is contemplated that the system 100 could include two or more servers 120. It is further contemplated that the server 120 could be a plurality of connected servers 120 sharing (in parallel or in series) execution of the various routines to be described below.

For simplicity purposes, and for the sake of the present description, the system 100 is depicted with only two categories of node, namely the user device 110A-F and the server 120 connecting through the network 150. It is contemplated, however, that the system 100 could include many more categories of node, and in each category of node, multiple types of equipment could be used. It is contemplated that the system 100 could include additional servers 120, web site servers, servers for providing a web service, storage systems, databases, and further networks. Each category of nodes may communicate with the other categories of node, in accordance with established protocols and standards. Additionally, it is contemplated that the number of each node could be different in different implementations.

Figure 3:
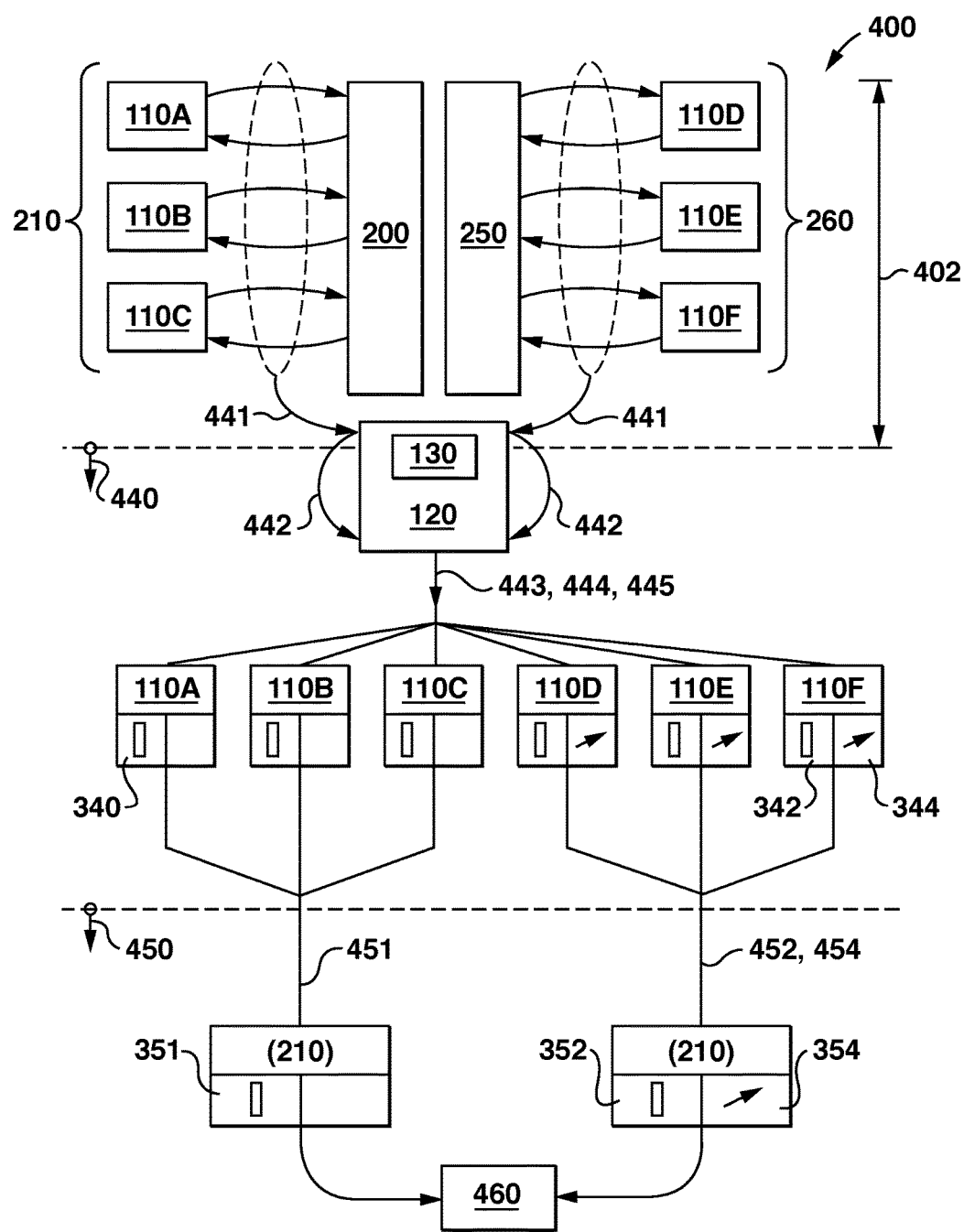
FIG. 3 is a schematic representation of a non-limiting implementation of a computer-implemented method in accordance with the present technology.

A method 400 for determining a trend of user engagement with respect to an experimental web service according to the present technology will now be described generally with reference to FIG. 3, which presents an overview of the method 400. A more detailed description of the specific steps and features of the method 400 will follow in reference to FIG. 5; an overview is first provided to present a more general understanding of the method 400 provided by the present technology.

A first part of the method 400 takes place over an experimental period 402, during which an experimental treatment applied to a web service is tested with respect to user engagement. During the experimental period 402, the server 120 receives a plurality of user device requests 115A-F for the web service from the user devices 110A-F through the network 150, as illustrated in FIG. 1.

As illustrated in FIG. 2, a portion of the user devices 110A-F is chosen for a control group 210. The control group 210, composed of the user devices 110A,B,C, receives a control version 200 of the web service from the server 120 during the experimental period 402. Similarly, a portion of the user devices 110A-F is chosen for a test group 260. The test group 260, composed of the user devices 110D,E,F, receives a test version 200 of the web service from the server 120 during the experimental period 402. The test version 250 of the web service is simply a version of the web service with the experimental treatment applied thereto. Examples of the experimental treatment include but are not limited to: aesthetic look of the web service, presentation algorithm, and a change in ranking or search method. The control version 200 of the web service is a version of the web service without the experimental treatment applied thereto. Often, the control version 200 will be a version of the web service that has previously been tested for users and for which good user engagement is expected. It is contemplated, however, that the control version 200 could be less well-received or tested.

During the experimental period 402, following each user device request 115A-F, the user devices 110A-F interact with their corresponding version 200, 250 of the web service. Indications of the plurality of interactions of the user devices 110A-F interacting with their corresponding version 200, 250 are then acquired 441 by the server 120. The server 120 can acquire 441 the plurality of indications either during the experimental period 402 or after its completion.

After completion of the experimental period 402, the method 400 continues with determination of an amplitude 342 and phase 344 metric related to the user engagement of each user device 110A-F. First the server 120 acquires 441 the plurality of indications if it did not do so during the experimental period 402, and the server 120 then accesses 442 those indications in order to perform a series of calculations. It is contemplated that the acquiring 441 could include, but is not limited to, saving the indications to a storage of the server 120. It is similarly contemplated that the accessing 442 could include, but is not limited to, retrieving the plurality of indications from the storage of the server 120 and preparing the plurality of indications in a data table, such as the data table 300 depicted in FIG. 4, or similar information structure in preparation for data manipulation by the server 120. An example of the plurality of indications for two of the user devices 110A-F organized into a data table is illustrated in FIG. 4, and will be discussed in more detail below.

The server 120 calculates 443 a periodicity metric for each user devices 110A-F, generally based on a discretization transform of the data set composed of the plurality of indications. The server 120 then calculates 444, 445 the amplitude 342 and phase metric 344 based on the magnitude and imaginary parts of the periodicity metric, respectively. The calculating 443, 444, 445 will be described in detail below.

Once the periodicity, amplitude 342 and phase 344 metrics have been calculated 443, 444, 445 for each one of the user devices 110A-F, average metrics are determined 450 for the control and test groups 210, 260. For the control group 210, the server calculates 451 a control average amplitude metric 351, which generally represents the magnitude of change in user engagement over the experimental period 402 on average for members of the control group 210. Similarly, the server calculates 452 a test average amplitude metric 352 for the test group 260, generally representing the magnitude of the change in user engagement on average for members of the test group 260. A test average phase metric 354 is also calculated 454, generally represents the trend of the change in user engagement over the experimental period 402 on average for members of the control group 210.

The method 400 then determines 460 the trend in user engagement due to the experimental treatment applied to the web service, specifically by analyzing the average metrics 351, 352, 354 of the control group 210 and the test group 260. As will be discussed in more detail below, the trend in the user engagement must be considered with respect to a specific user engagement metric (the type of interaction represented by the plurality of indications) in order to determine if the experimental treatment has had a positive or negative effect on user engagement generally.

Figure 5:
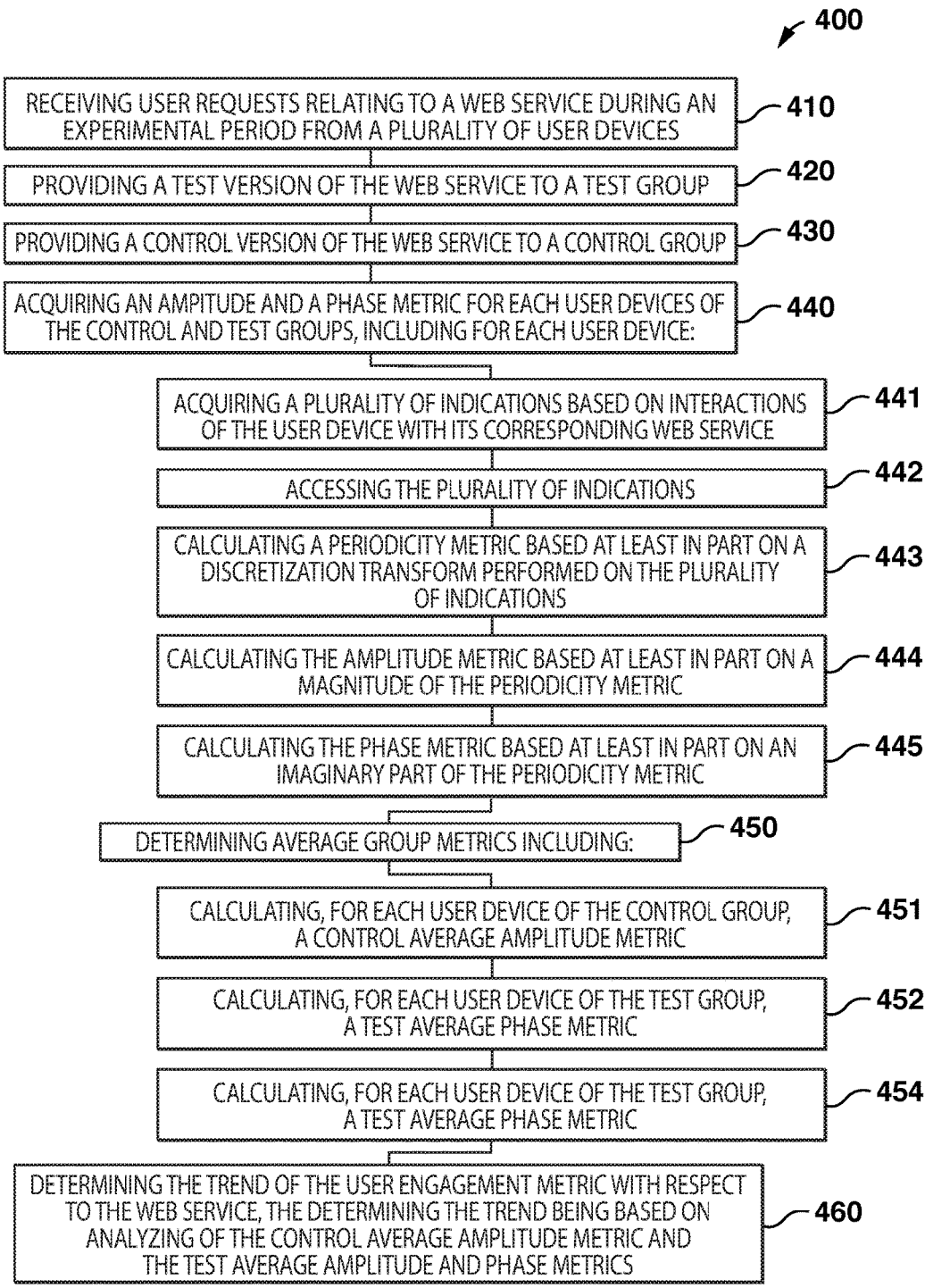
FIG. 5 is a flowchart illustrating the non-limiting implementation of the computer-implemented method of FIG. 3.

The steps and features of the method 400 will now be described in greater detail with respect to a linear flowchart of an implementation of the method 400 in accordance with non-limiting embodiments of the present technology as illustrated in FIG. 5. The computer-implemented method 400 for determining the trend of user engagement with respect to the web service is executable by the server 120 of a computer-implemented system such as the system 100.

The web service can be provided either directly from the server 120, or from a web service server via or at the behest of the server 120. The web service could include, but is not limited to: a search engine web site, a search engine results page, a web page, and a web site. The web service could further include any computational service accessed over the network 150. In some implementations, it is contemplated that the server 120 could simply direct the user device requests, monitor the interactions, and/or acquire the interactions after the experimental period 402.

The specific experimental treatment applied to the web service will tend to depend on the type of web service under inspection. It is contemplated that the experimental treatment could include many possibilities, including, but not limited to: aesthetic alterations of a home page of the web service and experimental ranking algorithms used for ranking search results on a SERP.

The control version 200 is provided in order to be able to determine if changes in user engagement detected during the experimental period 402 of the user device 110D,E,F are due to the experimental treatment or occurred for other reasons. As is often the goal, changes to the results of the control group 210 are compared to those of the test group 260. Any additional differences detected in the test group 260 during the experimental period 402 are assumed to be related to the experimental treatment.

The method 400 begins with receiving 410, at the server 120, the plurality of user device requests 115A-F relating to the web service during the experimental period 402, the plurality of user device requests 115A-F originating from the plurality of user devices 110A-F (see FIG. 1). While only one user device request 115A-F is illustrated as coming from each user device 110A-F, it should be understood that this is simply representative and it is that a plurality of user device requests 115A-F come from each user device 110A-F during the experimental period 402.

The user device requests 115A-F, in the case of the web service being a SERP for example, would be search queries submitted from the user to be entered into a search engine. It is contemplated that the user device requests 115A-F could be, but are not limited to, web site access requests and web service retrieval requests. It is also contemplated that the user device requests 115A-F could be automatically generated by the user devices 110A-F in some implementations.

The method 400 continues with the test group 260, composed of the user devices 110D,E,F, being provided 420 the test version 250 of the web service by the server 120 during the experimental period 402. Similarly, the control group 210, composed of the user devices 110A,B,C, is provided 430 the control version 200 of the web service by the server 120 during the experimental period 402.

While in the present example implementation, half of the user devices 110A-F are selected for the control group 210 and half for the test group 260, it is contemplated that the control and test groups 210, 260 could formed from higher or lower percentages of the total number of user devices 110A-F. It is also contemplated that some user device requests 115A-F may be excluded from the experiment completely, being provided a different version of the web service.

It is contemplated that the steps of providing 420 the test version 250 and providing 430 the control version 200 could occur in that order or in an opposite order. As the steps 420, 430 could be repeated many times from each or all of the user devices 110A-F as the users return to the web service multiple times during the experimental period 402, in some implementations the steps 420 and 430 will also be performed at the same time.

The method 400 continues with acquiring 440 the amplitude metric 342 and the phase metric 344 for each one of the user devices 110A-F of the control and test groups 210, 260. For simplicity, we will refer to the one user device of the user devices 110A-F under going the acquiring 440 steps as user device 110y. The acquiring 440 includes the following sub-steps for each one of the user devices 110A-F of the control and test groups 210, 260.

For each user device 110y, the acquiring 440 begins with the server 120 acquiring 441 a plurality of indications for the user device 110y, the plurality of indications being based on interactions of the user device 110y with its corresponding web service, either the test version 250 or the control version 200.

These indications are data representing indicators of user and user device interactions with the web service, or more specifically the corresponding control 200 or experimental 250 version of the web service. These indications could include but not limited to: a number of sessions, a presence time, a submission of a query, a number of queries submitted, a number of clicks, a number of clicks per query and an absence time. The indications could be data related to any interaction that is representative of user engagement, including data relevant to determining a measure or metric indicative of user engagement. It should be noted that the indications as described herein can be representative or interchangeable with user engagement metrics, as they provide, at least in part, a measure of user engagement with the web service. For example, an increasing dwell time from the user device 110y could indicate an increasing level of user engagement with the user of the user device 110y.

For each user device 110y, the indications are acquired 441 by collecting and saving the data and at least some information related to the time of the interaction, either directly by the server 120 or by an intermediary storage that is accessible by the server 120 via the network 150. At least some related time data is acquired with the plurality of indications for reasons that will be expounded on below. The indications can then be constructed as a time-series of indications, an example of which is illustrated in FIG. 4 for user devices 110A and 110F.

The time series of user interaction indications can be represented by a series of user interactions y composed of a daily time series of interactions ($y_0, y_1, y_2, \ldots y_{N-1}$) during the experiment period 402 of N days. In the example data set illustrated in FIG. 4, N=10 days, where the time series for the user device 110A is y=(1, 2, 1, 3, 4, 1, 2, 5, 4, 1), which represent the number of sessions the user device 110A had with the control version 200 of the web service on each day of the 10 days of the experimental period 402. Similarly, the time series for the user device 110F is y=(2, 3, 1, 1, 2, 4, 1, 4, 5, 2), which represents the number of sessions the user device 110F had with the test version 250 of the web service on each day of the 10 days of the experimental period 402.

While the experimental period 402 for the example data set in FIG. 4 is ten days, this experimental period 402 is only one example implementation. It is contemplated that the experimental period 402 could take place for a longer or shorter period of time. It is also contemplated that the experimental period 402 may be split into different time segments than days, including but not limited to: minutes, hours, weeks, and months. It is also contemplated that the experimental period 402 could be multiple separate time periods, for example the first day of each month over a multiple month period.

The method 400 continues with accessing 442 the plurality of indications for the user device 110y that have been acquired 441 by the server 120, after the experimental period 402 has finished. Based on the plurality of indications, the method 400 then continues with calculating 443, for each user device 100y, the periodicity metric based at least in part on a discretization transform performed on the plurality of indications. This transform acts to turn the time series data, such as the example shown in FIG. 4, into a function of frequency (periodicity).

The periodicity metric, being based on the plurality of indications including at least some time information, is used in order to determine changes in user engagement over the experimental period 402, rather than an average user engagement over the experimental period 402, as is sometimes done in other technologies. For instance, a user that is heavily engaged at the beginning of the experimental period 402 and not at all engaged at the end of the experimental period 402 could have the same average value as a user that has constant use all the way through. Even though the users may have the same average engagement over the period 402, the treatment effect could be said to have had a very different effect on the two users.

In the implementation described herein, the discretization transform function is implemented as a discrete Fourier transform. It is contemplated, however, that other appropriate functions may be used. The discretization transform function could also be implemented as, for example, a wavelet transform or a Laplace transform.

In some implementations, a Laplace transform could be used for the discretization transform. Generally, the Laplace transform is an integral transform which takes a function of a positive real variable to a function of a complex variable.

For the case of a wavelet transform, a discrete wavelet transform could be used, where the discrete wavelet transform is any wavelet transform for which the wavelets are discretely sampled. It is contemplated that the discrete wavelet transform implemented could be, but is not limited to, Haar wavelets and dual-tree complex wavelet transform.

In one implementation of the discrete wavelet transform, the implementation of wavelets can be interpreted as computing the wavelet coefficients of a discrete set of child wavelets for a given mother wavelet. In the case of the discrete wavelet transform of a data set f(x), the mother wavelet $\psi$ and the children wavelets v are defined as follows:

$$\psi_{j,k}(x) = \frac{1}{\sqrt{2^j}} \psi\left(\frac{x - k2^j}{2^j}\right); v_{jk} = \int_{-\infty}^{\infty} f(x) = \frac{1}{\sqrt{2^j}} \psi\left(\frac{x - k2^j}{2^j}\right) dx.$$

In the present implementation, the calculating 443 includes, for each user device 100y, applying the discrete Fourier transform to the time series of indications, such as the dataset 300. The Fourier transform of y can be represented as a sum of harmonic series $X_k$, illustrated by Eq. 1 below. The periodicity metric is the first harmonic term of the series $X_k$, represented by $X_1$.

$$X_k = \Sigma_{n=0}^{N-1} x_n e^{-in\omega_k}, \omega_k = \frac{2\pi k}{N} \quad \text{(Eq. 1)}$$

The method 400 then continues with calculation 444 of the amplitude metric 342 for each user device 100y, based at least in part on a magnitude of the periodicity metric $X_1$. The amplitude metric 342, A, is specifically the magnitude of the periodicity metric $X_1$ normalized to the number of sessions N, as shown in Eq. 2. It is contemplated that in some implementations the amplitude metric A 342 may be normalized by a different factor.

$$A = |X_1|/N \quad \text{(Eq. 2)}$$

The amplitude metric 342, based on the magnitude of the first harmonic term from the transform is sign-agnostic. Specifically, because the magnitude is calculated by taking the absolute value of the periodicity metric, the amplitude metric 342 cannot be used to infer if the experimental treatment has induced an increase or a decrease in the user engagement; it can only indicate the size of the change.

The method 400 continues with calculating 445 the phase metric 344 for each user device 110y, based on at least in part on an imaginary part of the periodicity metric for the user device 110y. Specifically, the phase metric P is calculated 445 by taking the imaginary part of the periodicity metric $X_1$, as illustrated by Eq. 3.

$$P = Im(X_1) \quad \text{(Eq. 3)}$$

The phase metric P 344, based on the imaginary part of the first harmonic term, is related to a phase of the periodicity metric. For a periodic function, such as the periodicity metric $X_1$, the phase is related to a trend of the function and more specifically if that metric is increasing or decreasing. It does not, however, give information as to the magnitude of the metric. As such, the phase metric P 344 cannot indicate how much the user engagement, based on the indications of user interaction, has changed during the experimental period 402. It does, however, provide an indication of the direction (increasing or decreasing) in which the user engagement is changing over the experimental period 402.

It should be noted that large or positive values for the amplitude metric 342 and/or the phase metric 344 do not directly indicate that there is increasing user engagement over the experimental period 402. Some user engagement metrics, represented by the plurality of indications, may indicate negative effects on the user engagement when having a positive or increasing value. For example, increasing values of absence time between sessions implies decreasing user engagement. The interpretation of the different values of the amplitude 342 and phase 344 metrics will be described in more detail below.

It should be noted that the steps 442-445 could be performed for each of the user devices 110A-F sequentially, or each step 442-445 could be performed for all the user devices 110A-F before proceeding to the next step. It is also contemplated that the steps of calculating 444, 445 the amplitude and phase metrics 342, 344 could be performed in a different order or simultaneously, keeping in mind that the calculation 443 of the periodicity metric $X_1$ is necessarily performed before the steps 444, 445. It is contemplated that in some implementations, a control phase metric could also be calculated for the control group 210.

Once the method 400 has calculated 444, 445 the amplitude and phase metrics 342, 344 for each of the user devices 110A-F, the method 400 continues with the server 120 determining 450 the average group metrics.

The control average amplitude metric 351 calculated 451 by averaging the control amplitude metrics 351 calculated for each of the user devices 110A-C of the control group 210. Similarly the test average amplitude metric 352 is calculated 452 by averaging the test amplitude metrics 342 calculated for each of the user devices 110D-F of the test group 260. The test average phase metric 354 is then calculated 454 by averaging the test phase metrics 344 calculated for each of the user devices 110D-F of the test group 260.

The method 400 then continues, once all the calculations 451, 452, 454 have been completed, with determining 460 the trend of the user engagement metric with respect to the web service. The determining 460 of the trend is based on analyzing the control average amplitude metric 351 and the test average amplitude 352 and phase metrics 354. In some implementations, an average phase metric of the control group can be determined as well from the average of the phase metrics of each member of the control group 210, but it is not required for all implementations.

Specifically, the determining 460 by analyzing includes determining a difference between the control average amplitude metric 351 and the test average amplitude metric 352, hereinafter referred to as the amplitude difference. As the control and test average amplitude metrics 351, 352 are indicative of the magnitude of the change in user engagement during the experimental period 402 for their respective groups, the amplitude difference is generally representative of the change in the user engagement due to the experimental treatment applied to the web service. The determining 460 the trend by analyzing then finishes by comparing the sign of the amplitude difference to the sign of the test average phase metric 354 (the sign of the metrics simply meaning whether they are mathematically positive or negative).

As the amplitude difference and the test average phase metric 354 each have two possible sign values (positive or negative), there are four possible user engagement trend results possible from the determining 460.

In a first one of the four possible scenarios, the method 400 further comprises determining that the experimental treatment applied to the web service has caused an increasing trend in the user engagement metric over the web service without the experimental treatment when the difference between the test average amplitude metric 352 and the control average amplitude metric 351 is positive and the test average phase metric 354 is positive. That this "positive/positive" scenario is interpreted as indicating an increasing trend in the user engagement metric can be understood, where the test average amplitude metric 352 is greater than the control average amplitude metric 351, and the test average phase metric 354 being positive indicates that the test average amplitude metric 352 is in a trend of increasing.

In a second one of the four possible scenarios, the method 400 further comprises determining that the experimental treatment applied to the web service has caused an increasing trend in the user engagement metric over the web service without the experimental treatment when the difference between test average amplitude metric 352 and the control average amplitude metric 351 is negative and the test average phase metric 354 is also negative.

The interpretation of this second scenario, while slightly less intuitive on its face than the first, follows similar logic. In this case, as the "direction" of change in the user engagement indicated by the test average phase metric 354 is toward the negative, the trend of the amplitude difference is toward the negative and getting larger (only in the negative direction). Thus the trend in user engagement is increasing, in the sense of becoming more substantial. It should be noted that the indications (or user engagement metrics) cannot actually be negative; for example, the number of clicks per session can be zero or a positive number, but never negative. The negative sign of the amplitude difference and phase are simply mathematical constructs, and as such growth in the negative direction has the same interpretation as growth in the positive direction. This "negative/negative" scenario is interpreted as indicating an increasing trend in the user engagement metric and can be understood considering that the test average amplitude metric 352 is less than the control average amplitude metric 351, and the test average phase metric 354 being negative indicates that the test average amplitude metric 352 is in a trend of decreasing (further "growing" the amplitude difference).

For the case of a user engagement metric where an increasing value indicates a positive effect of the experimental treatment on user engagement, the increasing trend in the user engagement metric, as described above in the first two scenarios, indicates an increase in user engagement over the experimental period 402. For example, if there is determined 460 to be an increasing trend in the number of clicks, this would indicate a positive effect on the user engagement of the experimental treatment on the web service. Conversely, however, the increasing trend would be indicative of a negative effect of the experimental treatment on the user engagement in the case of a user engagement metric such as absence time (greater values of absence time indicating a negative effect on actual user engagement).

In a third one of the four possible scenarios, the method further comprises determining that the experimental treatment applied to the web service has caused a decreasing trend in the user engagement metric over the web service without the experimental treatment when a difference between the test average amplitude metric 352 and the control average amplitude metric 354 is positive and the test average phase metric 354 is negative.

This "positive/negative" scenario is interpreted as indicating a decreasing trend in the user engagement metric. In this case, the "direction" of change in the user engagement indicated by the test average phase metric 354 is toward the negative and so the trend of the amplitude difference is toward the negative. Since the amplitude difference has a positive sign, however, if the amplitude difference is trending toward the negative, this indicates a trend toward decreasing size of the amplitude difference.

In a fourth one of the four possible scenarios, the method 400 further comprises determining that the experimental treatment applied to the web service has caused a decreasing trend in the user engagement metric over the unmodified version of the web service when a difference between the test average amplitude metric 352 and the control average amplitude metric 354 is negative and the test average phase metric 354 is positive.

This "negative/positive" scenario is interpreted as indicating a decreasing trend in the user engagement metric. In this case, the "direction" of change in the user engagement indicated by the test average phase metric 354 is toward the positive and so the trend of the amplitude difference is toward the positive. Since the amplitude difference has a negative sign, however, if the amplitude difference is trending toward the positive, this indicates a decreasing value in the amplitude difference.

For the case of a user engagement metric where an increasing value indicates a positive effect of the experimental treatment on user engagement, the decreasing trend in the user engagement metric, as described above in the third and fourth scenarios, indicates a decrease in user engagement over the experimental period 402. For example, if there is determined 460 to be a decreasing trend in the number of clicks, this would indicate a negative effect on the user engagement of the experimental treatment on the web service. Conversely, however, the decreasing trend would be indicative of a positive effect of the experimental treatment on the user engagement in the case of a user engagement metric such as absence time (smaller values of absence time indicating a positive effect on actual user engagement).

Finally, it is contemplated that in some implementations of the method 400, the determining 460 including determining the amplitude difference may result in an amplitude difference of zero. An amplitude difference of zero would not fall into the four scenarios described above, however, determining 460 including the analyzing would center only on the test average phase metric 354. In such implementations, the trend of the user engagement metric would be interpreted as increasing when the test average phase metric 354 is positive and as decreasing when the test average phase metric 354 is negative.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

It should be expressly understood that not all technical effects mentioned herein need to be enjoyed in each and every implementation of the present technology. For example, implementations of the present technology may be implemented without the user enjoying some of these technical effects, while other implementations may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:
1. A computer-implemented method for determining a trend of a user engagement metric with respect to a web service, the method being executable by a server, the method comprising:

receiving, at the server, a plurality of user device requests relating to a web service during an experimental period, the plurality of user device requests originating from a plurality of user devices;

providing, by the server, a test version of the web service to a test group selected from the plurality of user devices, the test version of the web service being the web service having an experimental treatment applied thereto;

providing, by the server, a control version of the web service to a control group selected from the plurality of user devices, the control version of the web service being a version of the web service without the experimental treatment applied thereto;

acquiring an amplitude metric and a phase metric for each one of the user devices of the control and test groups, the acquiring including, for a given one of the user devices of the control and test groups:

acquiring, by the server, a plurality of indications for the given one, the plurality of indications being based on interactions of the given one with its corresponding web service, accessing the plurality of indications for the given one, calculating a periodicity metric based at least in part on a discretization transform performed on the plurality of indications, calculating the amplitude metric based at least in part on a magnitude of the periodicity metric, the amplitude metric representing a magnitude of change of the user engagement metric with respect to the corresponding web service, and calculating the phase metric based at least in part on an imaginary part of the periodicity metric, the phase metric representing a direction of change of the user engagement metric with respect to the corresponding web service;

determining, by the server, average group metrics including:

calculating a control average amplitude metric by averaging amplitude metrics calculated for each of the user devices of the control group, calculating a test average amplitude metric by averaging amplitude metrics calculated for each of the user devices of the test group, and calculating a test average phase metric by averaging phase metrics calculated for each of the user devices of the test group;

determining the trend of the user engagement metric with respect to the web service, the determining the trend being based on analyzing of the control average amplitude metric and the test average amplitude and phase metrics; and when a difference between the test average amplitude metric and the control average amplitude metric and the test average phase metric have oppositely signed values, determining that the experimental treatment applied to the web service has caused a decreasing trend in the user engagement metric over the web service without the experimental treatment, wherein:
the difference between the test average amplitude metric and the control average amplitude metric is negative and the test average phase metric is positive, and
the decreasing trend in the user engagement metric indicates an increase in user engagement.

2. The method of claim 1, wherein the analyzing of the control average amplitude metric and the test average amplitude and phase metrics includes determining a difference between the test average amplitude metric and the control average amplitude metric.

3. The method of claim 1, further comprising determining that the experimental treatment applied to the web service has caused an increasing trend in the user engagement metric over the web service without the experimental treatment when:
a difference between the test average amplitude metric and the control average amplitude metric is positive; and
the test average phase metric is positive.

4. The method of claim 3, wherein:
an increasing value of the user engagement metric indicates a positive effect of the experimental treatment on user engagement; and
the increasing trend in the user engagement metric indicates an increase in user engagement over the experimental period.

5. The method of claim 1, further comprising determining that the experimental treatment applied to the web service has caused an increasing trend in the user engagement metric over the web service without the experimental treatment when:
a difference between test average amplitude metric and the control average amplitude metric is negative; and
the test average phase metric is negative.

6. The method of claim 5, wherein:
a decreasing value of the user engagement metric indicates a positive effect of the experimental treatment on user engagement; and
the increasing trend in the user engagement metric indicates a decrease in user engagement.

7. The method of claim 1, further comprising determining that the experimental treatment applied to the web service has caused a decreasing trend in the user engagement metric over the web service without the experimental treatment when:
a difference between the test average amplitude metric and the control average amplitude metric is positive; and
the test average phase metric is negative.

8. The method of claim 7, wherein:
an increasing value of the user engagement metric indicates a positive effect of the experimental treatment on user engagement; and
the decreasing trend in the user engagement metric indicates a decrease in user engagement.

9. The method of claim 1, wherein:
a difference between the test average amplitude metric and the control average amplitude metric is zero; and
further comprising determining that the experimental treatment applied to the web service has caused:
an increasing trend in the user engagement metric over the unmodified version of the web service when the test average phase metric is positive; and
a decreasing trend in the user engagement metric over the unmodified version of the web service when the test average phase metric is negative.

10. The method of claim 1, wherein the interactions of the given user device include at least a number of sessions.

11. The method of claim 1, wherein the interactions of the given user device include at least one of a dwell time and a time per session.

12. The method of claim 1, wherein the interactions of the given user device include at least a number of clicks.

13. The method of claim 1, wherein the discretization transform is performed using a discrete Fourier transform.

14. The method of claim 1, wherein the discretization transform is performed using at least one of a wavelet transform and a Laplace transform.

15. The method of claim 1, wherein the interactions of the given user device include at least a number of queries.

16. The method of claim 1, wherein the web service is a search engine.

17. The method of claim 1, wherein the web service is a search engine results page.

18. A server comprising a processor, the processor being configured to determine a trend of a user engagement metric with respect to an experimental web service, the processor being configured to render the server to execute:

receiving, at the server, a plurality of user device requests relating to a web service during an experimental period, the plurality of user device requests originating from a plurality of user devices;

providing, by the server, a test version of the web service to a test group selected from the plurality of user devices, the test version of the web service being the web service having an experimental treatment applied thereto;

providing, by the server, a control version of the web service to a control group selected from the plurality of user devices, the control version of the web service being a version of the web service without the experimental treatment applied thereto;

acquiring an amplitude metric and a phase metric for each one of the user devices of the control and test groups, the acquiring including, for a given one of the user devices of the control and test groups:

acquiring, by the server, a plurality of indications for the given one, the plurality of indications being based on interactions of the given one with its corresponding web service, accessing the plurality of indications for the given one, calculating a periodicity metric based at least in part on a discretization transform performed on the plurality of indications, calculating the amplitude metric based at least in part on a magnitude of the periodicity metric, the amplitude metric representing a magnitude of change of the user engagement metric with respect to the corresponding web service, and calculating the phase metric based at least in part on an imaginary part of the periodicity metric, the phase metric representing a direction of change of the user engagement metric with respect to the corresponding web service;

determining, by the server, average group metrics including:

calculating a control average amplitude metric by averaging amplitude metrics calculated for each of the user devices of the control group, calculating a test average amplitude metric by averaging amplitude metrics calculated for each of the user devices of the test group, and calculating a test average phase metric by averaging phase metrics calculated for each of the user devices of the test group; and determining the trend of the user engagement metric with respect to the web service, the determining the trend being based on analyzing of the control average amplitude metric and the test average amplitude and phase metrics; and when a difference between the test average amplitude metric and the control average amplitude metric and the test average phase metric have oppositely signed values, determining that the experimental treatment applied to the web service has caused a decreasing trend in the user engagement metric over the web service without the experimental treatment, wherein:

the difference between the test average amplitude metric and the control average amplitude metric is negative and the test average phase metric is positive, and the decreasing trend in the user engagement metric indicates an increase in user engagement.

\* \* \* \* \*